United States Patent [19]

Kanamaru et al.

[11] Patent Number: 5,298,890
[45] Date of Patent: Mar. 29, 1994

[54] DISCONTINUOUS MOVEMENT SYSTEM AND METHOD FOR MOUSE CURSOR

[75] Inventors: Yoichi Kanamaru; Toshio Nakamura, both of Tokyo, Japan

[73] Assignee: Oki Electric Industry Co., Ltd., Tokyo, Japan

[21] Appl. No.: 683,265

[22] Filed: Apr. 10, 1991

[30] Foreign Application Priority Data

Apr. 11, 1990 [JP] Japan .................................. 2-93953

[51] Int. Cl.$^5$ .............................................. G09G 3/02
[52] U.S. Cl. .................................. 345/157; 345/115; 345/119; 345/120
[58] Field of Search ............... 340/724, 721, 712, 734, 340/723, 709, 706; 395/155, 156, 157, 159

[56] References Cited

U.S. PATENT DOCUMENTS

| | | | |
|---|---|---|---|
| 4,586,035 | 4/1986 | Baker et al. | 340/723 |
| 4,860,218 | 8/1989 | Sleator | 364/518 |
| 4,975,690 | 12/1990 | Torres | 340/706 |
| 4,987,411 | 1/1991 | Ishigami | 340/709 |
| 5,047,754 | 9/1991 | Akatsuka et al. | 340/709 |

*Primary Examiner*—Tommy Chin
*Assistant Examiner*—A. Au
*Attorney, Agent, or Firm*—Edward D. Manzo

[57] ABSTRACT

A cursor moving system includes a designated-area management unit for processing for display on a screen of areas to be designated by a cursor. A cursor position management unit processes movement of a cursor indication position on the screen according to a cursor moving operation by a pointing device. A cursor position determination unit searches for a designated area to which the cursor belongs now, and another designated area existing in a travelling direction of the cursor, based on information on a current position of the cursor and information on a travelling direction of the cursor received from the cursor position management unit in response to the pointing device. It also determines whether or not the nearest designated area existing in a travelling direction is separated from the current designated area. If separated, then it informs the cursor position management unit, when the cursor arrives at the boundary of the current designated area, of position information on a cursor display position, which resides within the determined nearest other designated area and is nearest from the designated area in which the cursor resides now, as the current position information of the cursor at that time. The cursor position management unit recognizes the position information communicated from the cursor position determination unit as information of the current position, and thereafter sequentially modifies such a newly recognized current position information based on the travelling direction and amount information from the pointing device, so that the cursor is sequentially moved.

8 Claims, 4 Drawing Sheets

DISCONTINUOUS MOVEMENT SYSTEM AND METHOD FOR MOUSE CURSOR

BACKGROUND OF THE INVENTION

1. Field of the Invention

The present invention relates to a cursor moving system by a pointing device.

2. Description of the Prior Art

A pointing device is one which permits a cursor for indicating a figure, character and etc., on a screen to freely travel on the screen, and is popular as simple pointing means of a computer system.

As such a pointing device, a so-called mouse is most broadly used. The mouse is classified roughly into two types, one of which is a mechanical type of mouse wherein a travelling distance is obtained in response to rotation of a ball contained in a mouse main body, and another of which is an optical type of mouse wherein a travelling distance is obtained in response to reflection of the light emitted from a mouse main body. To either type of mouse, however, the same cursor moving system can be applicable.

A conventional cursor moving system employed by the mouse will be explained hereinafter. A processing apparatus, to which the mouse is connected, is provided with a designated-area management unit which provides processing for display on a screen of areas to be designated such as windows and icons having figures, characters and so on which are objects to be indicated by a cursor, and a cursor position management unit which provides processing for movement of a cursor indication position on the screen according to a moving operation of the mouse main body.

In such a system, there is provided such a control that at the time of the moving operation of the mouse main body, first, the cursor position management unit recognizes the current position of the cursor on the screen, and then takes in regular intervals of time travelling direction information and travelling amount information output from the mouse main body to modify the previously recognized current position information based on those travelling direction information and travelling, amount information, so that the cursor sequentially travels to the current position after the modification. Thus, the cursor may be continuously traversed across the screen by an amount corresponding to the amount of movement provided by the mouse main body.

According to the conventional cursor moving system as stated above, however, an amount of travel of the cursor on the screen is always given by certain ratios with an amount of travel of the mouse main body. Thus, if it is desired to travel on the screen over the large distance, then the mouse main body also would be obliged to move over the large distance. Consequently, in such an environment that a large space as a moving space for the mouse main body cannot be secured, one would be obliged to repeatedly move the mouse main body, thereby increasing a time for operation of the mouse. This causes problems such as deterioration of work efficiency, and increment of an operator's load.

Further, in such a case where a cursor, which is located in a specific window on a screen, is shifted to an icon which is a great distance from the window, not only must the mouse travel a great distance in a direction coupling the window and the icon, but also it is necessary for an operator to visually confirm whether or not the cursor has properly entered within a frame of the icon. This point further augments an operator's load by requiring the operator to use great caution, and thus causes deterioration of work efficiency.

SUMMARY OF THE INVENTION

It is therefore an object of the present invention to provide a cursor moving system by a pointing device such as a mouse, which is capable of reducing an amount of travel of the pointing device itself comparing with a moved distance of the cursor on a screen, in a case where the cursor is travelled between the designated-areas which are separated from each other.

Further, it is an object of the present invention to provide a cursor moving system capable of readily moving the cursor into a designated area of interest, and thus improving work efficiency and reducing an operator's workload.

More specifically the invention in it preferred embodiment provides a cursor moving system which includes (A) designated-area management unit for processing the display on a screen of areas to be designated such as windows and icons having figures, characters and so on which are objects to be indicated by a cursor (B), the cursor position management unit for processing the movement of a cursor indication position on the screen according to a cursor moving operation by a pointing device, and (C) cursor position determination unit adapted to search for a designated area to which the cursor belongs now, and another designated area which exists in a travelling direction of the cursor, based on information as to a current position of the cursor and information as to a travelling direction of the cursor received from the cursor position management unit at the time of the cursor moving operation by the pointing device, and further to determine whether or not the nearest designated area which exists in a travelling direction is separated from the current designated area. If it is determined to be so separated, then the cursor position determination unit will inform the cursor position management unit, when the cursor arrives at the boundary of the current designated area, of position information as to a cursor display position, which resides within the determined nearest other designated area and is nearest from the designated area in which the cursor resides now, as the current position information of the cursor at that time. The cursor position management unit recognizes the position information communicated from the cursor position determination unit as information of the current position, and thereafter sequentially modifies such a newly recognized current position information based on the travelling direction information and travelling amount information from the pointing device, so that the cursor is sequentially moved to the current position after the modification.

In the cursor moving system according to the embodiment of the present invention, at the time of movement of the cursor by the operation of the pointing device, designated areas which may be situated in a cursor travelling direction are searched for by a cursor position determination unit, and there is provided such a control that in a case where the cursor is travelled from a first designated area to a second designated area which is separated from the first designated area, an interruption control program processing unit rewrites the current position of the cursor in accordance with the processing of the cursor position determination unit, regardless of a moving operation of the pointing device, at a point of time when the cursor arrives at the boundary of the first designated area, thereby permitting the discontinuous travelling of the cursor in which the cursor is shifted at a stroke to the second designated area. This feature makes it possible, in such a case where the cursor is moved between the designated areas which are separated, to reduce travel of the pointing device itself in comparison with a travelling distance of the cursor on the screen, and also to locate readily and reliably the cursor into the designated area of interest. Thus, according to the cursor moving system of the present invention, it is possible to improve work efficiency and to reduce an operator's load.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
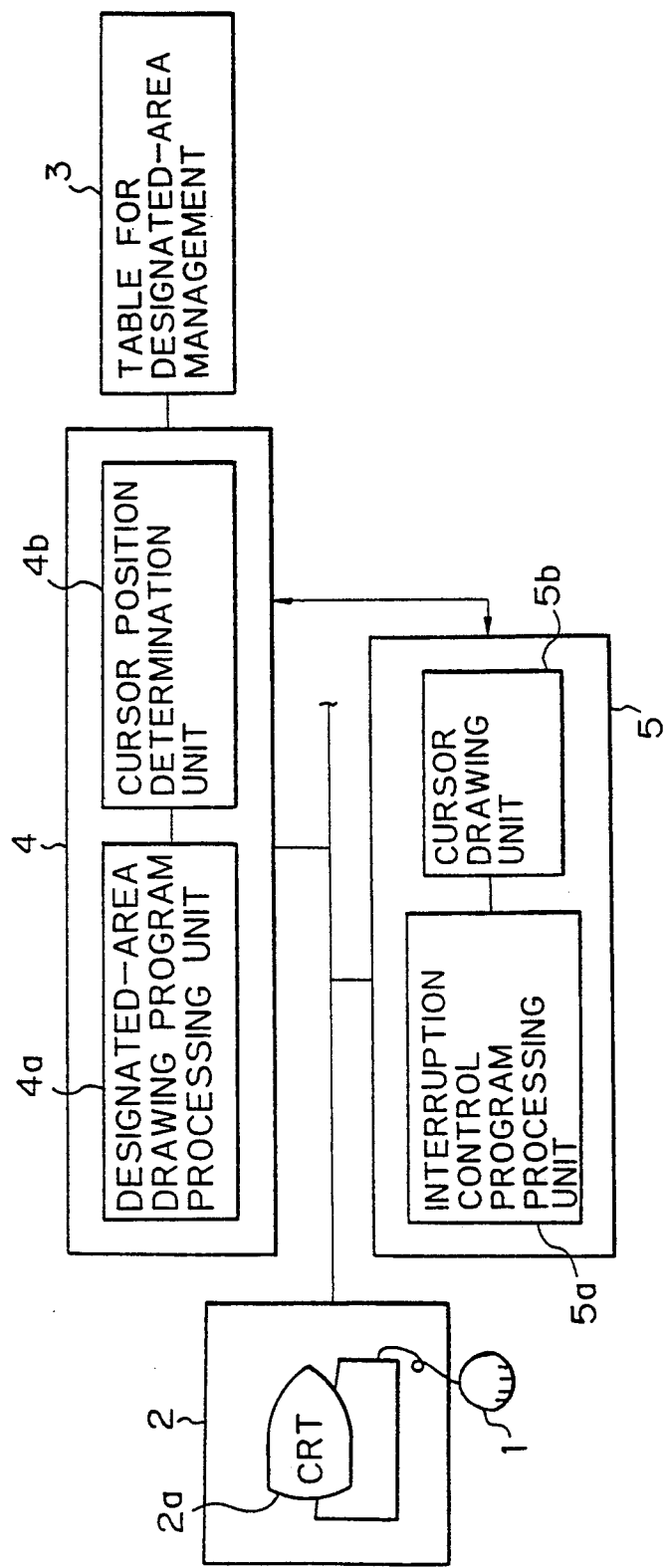
FIG. 1 is a block diagram showing an arrangement of an apparatus according to an embodiment of the present invention.
Figure 2:
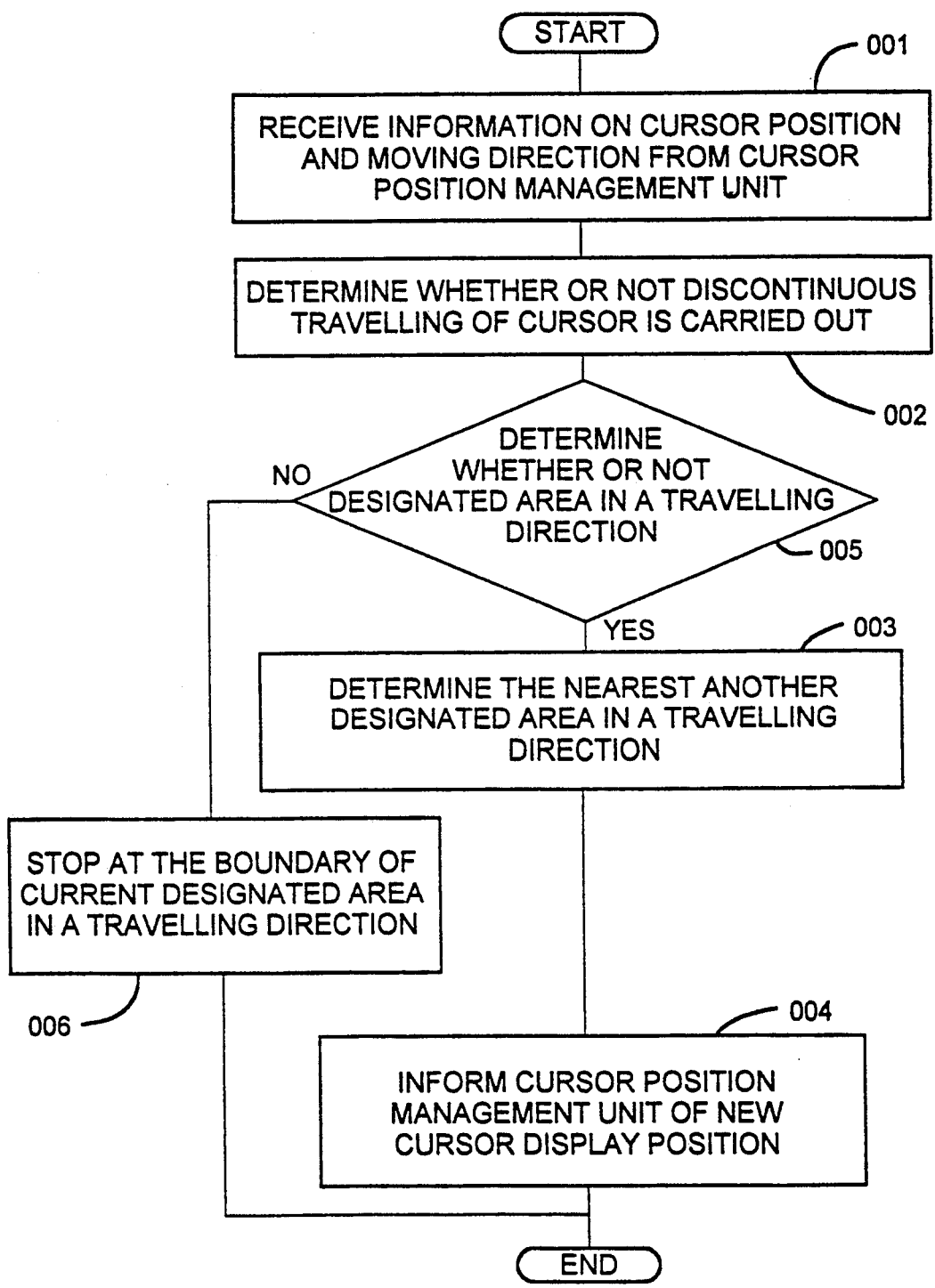
FIG. 2 is a flow chart showing processing of the cursor position determination unit in the embodiment of the present invention.
Figure 3:
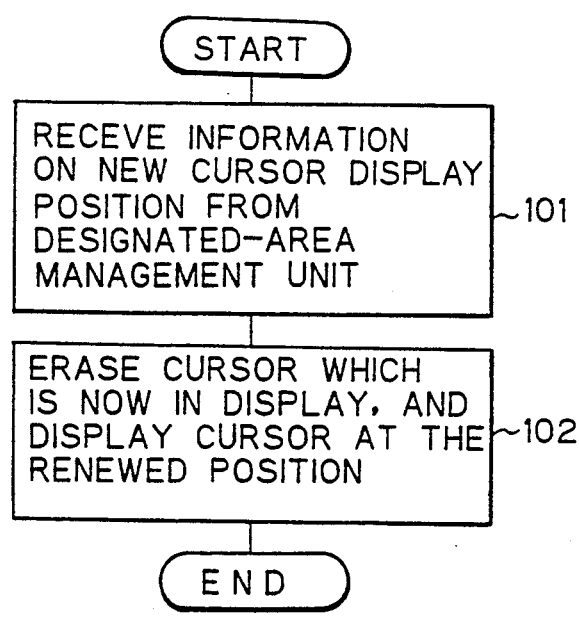
FIG. 3 is a flow chart showing processing of the interruption control program processing unit in the embodiment of the present invention.

FIG. 1 is a block diagram showing an arrangement of an apparatus according to an embodiment of the present invention. FIGS. 2 and 3 are flow charts showing operations of the main parts in FIG. 1. A cursor moving system of the present embodiment is one in which a mouse is used as a pointing device.

First, referring to FIG. 1, the apparatus according to the present embodiment is explained. A mouse 1 is connected to a processing device 2 provided with a screen 2a for information display of a CRT. Connected to the processing device 2, as illustrated, is a designated-area management table 3, a designated-area management unit 4 and a cursor position management unit 5.

The designated-area management table 3 is formed on a memory device (not illustrated) connected to the processing device 2, and is for storing position information of the individual designated areas (corresponding to windows and icons having figures and characters which are objects to be indicated by a cursor) which are displayed on the screen 2a, and information as to any sequence of the designated areas (such a case where a plurality of windows are displayed on an overlapping basis).

The designated-area management unit 4 is provided with a designated-area drawing program processing unit 4a and a cursor posit-Ion determination unit 4b. The designated-area drawing program processing unit 4a performs processing for display of the designated areas on the screen based on the information stored in the table 3, for example, a processing for a multi-display of a plurality of windows. The cursor position determination unit 4b performs, at the time of mouse travel a processing operation as shown in FIG. 2.

That is, at the time of a mouse travelling, first, the cursor position determination unit 4b receives from the cursor position management unit 5 information as to the current position of the cursor on the screen 2a and information as to the travelling direction of the cursor (step001).

Next, in step 002, the cursor position determination unit 4b searches a designated area to which the cursor belongs now, and other designated-area which exists in a travelling direction, based on the information received from the cursor position management unit 5. It further determines whether or not the nearest designated area which exists in a travelling direction is separated from the current designated area. If determined as being separated, then unit 4b determines whether or not a discontinuous travelling of the cursor is carried out (step 005 and 006).

The search for another designated area which exists in a travelling direction is performed, according to the present embodiment, in such a way that upon supposing a half line or ray on the screen extended from the current position of the cursor in the direction of travelling, based on the information received from the cursor position management unit 5, designated area through which the half line or ray on the screen passes is searched for based on the information on the designated-area management table 3.

According to the present embodiment, if there is no other designated area which exists in a travelling direction, the cursor position determination unit 4b informs cursor position management unit 5 of such a matter. The cursor is stopped from travelling further, even while the mouse is moved, at the juncture when the cursor on the screen arrives at a boundary of the current designated area.

The term "discontinuous travelling of the cursor" means such long distance travelling of the cursor that for example, in a case where the cursor travels between the windows which are separated from each other, the cursor is shifted at a stroke from one window to other, regardless of travel of the mouse.

On the other hand, the term "continuous travelling of the cursor" means such travelling of the cursor that the cursor travels on the screen corresponding to travel of the mouse. This scheme is utilized in the conventional cursor movement system.

A criterion as to whether or not the discontinuous travelling of the cursor is carried out is given, in case of the present embodiment, by such a matter as to whether or not both the following two conditions are simultaneously satisfied.

Criterion 1. The cursor travels from the inside of the current designated area toward the outside thereof and arrives at a boundary of the current designated area.

Criterion 2. An operator makes a request for the discontinuous travelling of the cursor (The designated-area management table 3 contains information of an icon for selecting the discontinuous travelling of the cursor. It is determined that the operator makes a request for the discontinuous travelling by previously indicating such an icon on the screen 2a. When the selection of the icon is released, the cursor position determination unit 4b becomes inoperative, so that the continuous travelling may be performed as in the conventional one).

If those criteria 1 and 2 are not satisfied, the cursor position determination unit 4b terminates the processing. Otherwise, the cursor position determination unit 4b determines the nearest other designated area in a travelling direction at that time (step 003).

The determination of the nearest designated area is to select another designated area nearest to the designated area in which the cursor resides now, among the designated areas existing in the travelling direction of the cursor which have been obtained by the search in step 002.

Next, in step 004, the cursor position determination unit 4b informs an interruption control program processing unit 5a of the cursor position management unit 5 of position information as to a cursor display position, which resides within the determined nearest other designated area and is nearest from the designated area in which the cursor resides now, as the next position information of the cursor at that time.

The cursor position management unit 5 is provided for causing a cursor display position to travel on the screen 2a in accordance with movement of the mouse 1. It includes an interruption control program processing unit 5a and a cursor drawing unit 5b.

The interruption control program processing unit 5a, at the time of the mouse movement, first recognizes the current position of the cursor on the screen 2a. The current position is given by coordinates of a final stop position of the cursor at the time of the previous movement, or by coordinates of a predetermined position on the screen as an initial position, Unit 5a permits interruption from the mouse 1, and takes (inputs, reads, or receives) in regular intervals of time travelling direction information and travelling amount information output from the mouse I to sequentially modify the previously recognized current position information based on such travelling direction information and travelling amount information.

When the cursor position determination unit 4b has informed the interruption control program processing unit 5a of position information as to a cursor display position for execution of the discontinuous travelling of the cursor, the interruption control program processing unit 5a recognizes the so informed position information as information of the current position. It thereafter sequentially modifies such a newly recognized current position information based on the travelling direction information and travelling amount information from the mouse 1.

The cursor drawing unit 5b is provided for causing the cursor to be displayed on or deleted from the screen 2a based on the information from the interruption control program processing unit 5a. At the time of the mouse movement, if the interruption control program processing unit 5a has modified the current position information, the cursor drawing unit 5b is operative to delete the cursor which is located at the previous current position and to display the cursor at the renewed current position after modification, thereby indicating a cursor travelling.

FIG. 3 is a flow chart for explaining the processing of the cursor position management unit 5 in case of carrying out the discontinuous travelling of the cursor.

In step 101, the interruption control program processing unit 5a recognizes, upon receipt of position information as to a cursor display position from the cursor position determination unit 4b, the informed position information as information of the current position.

In step 102, the cursor drawing unit 5b operates to temporarily erase the cursor, which has been displayed on the screen 2a, and to display the cursor at the renewed current position which has been newly recognized by the interruption control program processing unit 5a.

Figure 4:
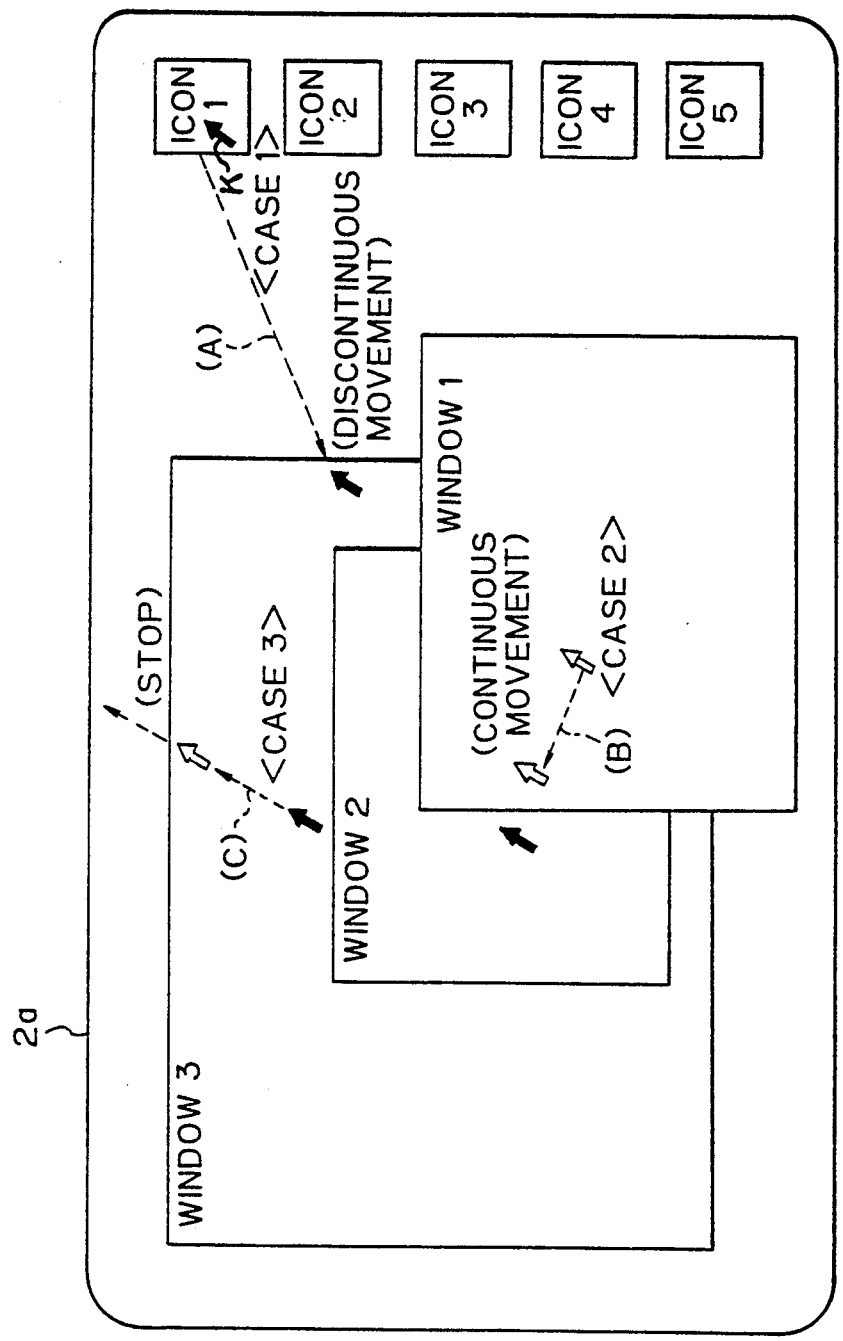
FIG. 4 is a view used for the explanation of examples for a cursor travelling by a cursor moving system according to the present embodiment.

FIG. 4 is a view used for the explanation of examples for a cursor travelling by a cursor moving system according to the present embodiment as discussed above. The cursor is represented by an arrowhead or pointer Three cases are depicted. In FIG. 4, there are displayed on the screen 2a, as the designated areas, three windows 1, 2 and 3 and five icons 1-5. The windows 1-3 are mutually overlapped. It is assumed that an operator has previously made a request for the discontinuous travelling of the cursor.

Case 1: This is such a case that first, a cursor K is located in an icon 1, the icon 1 is selected, and thereafter the cursor K is shifted to a window 3, as shown by arrow A of the broken line. This is an example in which the cursor K moves between separated designated areas (the icon at the right side of the screen 2a and window 3 to the left of the icons).

In this case, there is provided the discontinuous travelling of the cursor between those designated areas in such a manner that when the cursor K located in the icon 1 travels toward the window 3 and arrives at the boundary of the icon 1, the cursor position determination unit 4b informs the interruption control program processing unit 5a of the position information as to location which is nearest to the icon 1 in the window 3.

Case 2: This is an example wherein a cursor K located in a window I is shifted to the window 2, as shown by arrow B of the broken line. That is, this is an example in which the cursor K is moved between the mutually adjacent designated areas.

In this case, since the window I and the window 2 are mutually adjacent, there is provided the ordinary continuous travelling of the cursor by the cursor position determination unit 4b, without performing the discontinuous travelling of the cursor.

Case 3: In this example a cursor K located in a window 3 is moved in such a direction that no windows or the like exist, as shown by arrow C of the broken line. That is, this is an example in which the cursor K is moved in a direction toward no other designated area.

In this case, no other designated areas is found when cursor position determination unit 4b searches the other designated areas which may lie in a cursor's travelling direction, and the cursor position determination unit 4b informs the interruption control program processing unit 5a thereof. Consequently, the cursor K located in the window 3 is stopped at a time when it arrives at the boundary of the window 3, even while the mouse is moving. It should be noted, however, that if an operator has not made a request for the discontinuous travelling of the cursor, it is possible to move the cursor K out of the window 3 according to the travel of the mouse.

As explained above, in the cursor moving system according to the embodiment of the present invention, at the time of movement of the cursor caused by the operation of the mouse 1, designated areas which may lie in a cursor's travelling direction are searched, and there is provided such a control that in a case where the cursor is moved from a first designated area to a second designated area which is separated from the first designated area, the interruption control program processing unit 5a rewrites the current position of the cursor in accordance with the processing of the cursor position determination unit 4b, regardless of movement of the mouse 1, at a point of time when the cursor arrives at the boundary of the first designated area, thereby permitting the discontinuous travelling of the cursor, the cursor being shifted at a stroke to the second designated area. This feature makes it possible, in such a case where the cursor is moved between the designated areas which are separated, to reduce the distance of travel of the mouse itself in comparison with the distance travelled by cursor on the screen, and also to transport or introduce the cursor readily and reliably to the designated area of interest. Thus, according to the cursor moving system of the present invention, it is possible to improve work efficiency and to reduce an operator's load.

While the criteria as to whether or not the discontinuous travelling of the cursor is carried out include, in case of the embodiment as stated above, a matter as to whether or not an operator makes a request for the discontinuous travelling of the cursor, it may be considered that the discontinuous travelling of the cursor is carried out, without taking such a matter into account, but taking only a matter as to the cursor travels beyond the boundary of the current designated area, as the criterion. However, in a case where a matter as to whether or not an operator makes a request for the discontinuous travelling of the cursor is included in the criterion, there is such an advantage that a cursor moving system, which is suitable for the situation, can be selected, since the operator can alternatively select the continuous travelling of the cursor or the discontinuous travelling of the cursor.

It should be noted that the pointing device in the cursor moving system is not restricted to the mouse as shown in the embodiment, and may be a track ball and so on.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. In a display system having a movable cursor, a cursor moving system comprising:
   a designated-area management unit for providing display information from which the display system generates a display image on a screen, the display image including a plurality of designated areas; and
   a cursor position management unit for determining movement of a cursor on said screen in accordance with manipulations of a pointing device, said cursor position management unit recognizing a current cursor position of the cursor on said screen, and acquiring at regular intervals of time travelling direction and travelling distance information of the cursor to modify the current cursor position so that the cursor continuously travels to a boundary of one of the designated areas wherein the cursor is located, said cursor moving system further including:
   a cursor position determination unit effective to search for the current cursor position ("current designated area"), and another of the designated areas ("next designated area") which exists in a travelling direction of the cursor; wherein
   if the next designated area does not exist in the travelling direction of the cursor, then said cursor position determination unit is effective to inform said cursor position management unit to stop the cursor when it arrives at the boundary of the current designated area,
   but if the next designated area does exist, said cursor position determination unit being effective then to determine whether the next designated area is separated from the current designated area, and
   if separated, then to inform said cursor position management unit, when the cursor arrives at the boundary of the current designated area, of the next cursor position within the next designated area, wherein said cursor position management unit recognizes the next cursor position, and thereafter sequentially modifies the current cursor position so that the cursor discontinuously advances to the next cursor position,
   but if the next designated area is not separated from the current designated area, then said cursor position management unit causes the cursor to be continuously moved to the next designated area.

2. A system according to claim 1, wherein said cursor position determination unit is included in said designated-area management unit.

3. A system according to claim 1, wherein said cursor moving system further comprises:
   a designated-area management table for storing position information of each of the designated areas which are displayed on said screen and information as to a sequence of the designated areas; and wherein
   said designated-area management unit includes a designated-area drawing program processing unit for providing information for displaying the designated areas on said screen based on the information stored in said designated-area management table and said cursor position determination unit.

4. A system according to claim 3, wherein said cursor position management unit comprises:
   an interruption control program processing unit which recognizes the current cursor position on said screen, permits an interruption from said pointing device, and takes in at regular intervals of time the travelling direction and the travelling distance information from said pointing device to sequentially modify the current cursor position; and
   a cursor drawing unit for causing the cursor to be displayed on or deleted from said screen based on information from said interruption control program processing unit,
   wherein when said cursor position determination unit supplies to said interruption control program processing unit the next cursor position for execution of a discontinuous movement of the cursor, said interruption control program processing unit recognizes the next cursor position and said cursor drawing unit is operative, at the time of movement of said pointing device and if said interruption control program processing unit has recognized the next cursor position, to delete the cursor at the current cursor position and to display the cursor at the next cursor position, thereby indicating the discontinuous cursor movement.

5. A system according to claim 1, wherein said pointing device is a mouse.

6. A system according to claim 1, wherein said pointing device is a track ball.

7. In a display system having a movable cursor, a method for moving a cursor comprising the steps of:

receiving display information and generating a display image based thereon on a screen, the display image including a plurality of designated areas; and determining movement of a cursor on said screen in accordance with manipulations of a pointing device, including recognizing a current cursor position of the cursor in a current designated area on said screen, and acquiring at regular intervals of time travelling direction and travelling distance information of the cursor to modify the current cursor position so that the cursor continuously travels to a boundary of the current designated area;

searching for a next designated area which exists in a travelling direction of the cursor;

if the next designated area does not exist in the travelling direction of the cursor, then stopping the cursor when it arrives at the boundary of the current designated area, but if the next designated area does exist, then determining whether the next designated area is separated from the current designated area, and if the next designated area is separated from the current designated area, then when the cursor arrives at the boundary of the current designated area, moving the next cursor position to within the next designated area, including recognizing the next cursor position, and thereafter sequentially modifying the current cursor position so that the cursor discontinuously advances to the next cursor position, but if the next designated area is not separated from the current designated area, then causing the cursor to be continuously moved to the next designated area.

8. A method according to claim 7, further comprising:

maintaining a designated-area management table for storing position information of each of the designated areas which are displayed on said screen and information as to a sequence of the designated areas; and providing information for displaying the designated areas on said screen based on the information stored in said designated-area management table.

* * * * *